3,801,659
METHOD OF REMOVING CORROSION-PROMOTING SUBSTANCES FROM CHLORINATED HYDROCARBONS
Jan Andérs Dahlberg, Skoghall, and Virve Oivikki Christiansen, Karlstad, Sweden, assignors to Uddeholms Aktiebolag, Uddeholms, Sweden
No Drawing. Filed Jan. 18, 1971, Ser. No. 107,529
Int. Cl. C07c 21/04
U.S. Cl. 260—654 S      1 Claim

ABSTRACT OF THE DISCLOSURE

Corrosion-promoting substances are removed from a chlorinated hydrocarbon, such as trichloroethylene and perchloroethylene by treating the chlorinated hydrocarbon with an anion-exchanger. The anion-exchanger is regenerated by being treated with a neutral, or slightly acid, aqueous solution containing a non-corrosion-promoting anion, such as the bicarbonate ion, the chromate ion, the phosphate ion, the monohydrogen phosphate ion and the dihydrogen phosphate ion. The regenerated anion-exchanger is now dried to a water content of less than 10% by weight, and is now ready for use.

---

It is a known fact that a chlorinated hydrocarbon, such as trichloroethylene and perchloroethylene, as used, for example, in degreasing metal and for dry cleaning, in spite of the addition of stabilizing substances such as phenols and amines, are often found to be not quite stable, but give rise to corrosion-promoting substances such as hydrogen chloride and other decay products which develop chloride ions in water. Such decay products must be removed, not only because they cause corrosion in the apparatus and also in the materials to be cleaned in this (chloride ions are notorious in promoting corrosion in even alkaline or neutral environments), but also because they give the solvent an unpleasant odor and often have a self-catalyzing effect on the decomposition reaction.

The object of this invention is thus primarily to remove chloride ions, or compounds which produce chloride ions, from the chlorinated hydrocarbon during its use in the degreasing and dry-cleaning processes. The most usual principle so far used for this purpose is aimed at the acid character of the chloride-producing substances. According to Swedish Pat. No. 175,069, thus, the solvent is washed free of acid compounds by allowing it to pass through an alkaline water solution. However, in practice this method has the disadvantage that the chlorinated hydrocarbon liberated from acid compounds may cause small drops of the alkaline washing solution from the neutralization vessel to pass through the pipes into the treating vessel. Thus, after some time in use a water solution containing chloride ions is carried together with the solvent to the treating vessel and may cause small quantities of chlorides (for example sodium chloride and ammonium chloride) to adhere to the articles being washed, and gradually cause corrosion. Another disadvantage with this method is that water-soluble stabilizers are washed out of the solvent.

A variant of the method described above is the use of a neutralizing bed consisting of an aqueous hydroxyl-ion-saturated anion-exchanger (U.S. Pat. No. 2,888,494). One disadvantage with this method is that the ion-exchanger should contain 10–20% of water, which will in time be dissolved out by the chlorinated hydrocarbon and accompany it to the treating vessel. Here, together with compounds producing chloride ions, it contributes to corroding the apparatus and the articles being treated.

According to the invention the disadvantages mentioned above are eliminated.

The method according to the invention comprises the removal of corrosion-promoting substances from chlorinated hydrocarbon with the help of an anion-exchanger, and is characterized in that the anion-exchanger is treated with a neutral, or slightly acid, aqueous solution containing a non-corrosion-promoting anion, after which the anion-exchanger is dried to a water content of less than 10% by weight and the chlorinated hydrocarbon is brought into contact with the anion-exchanger thus treated.

The ion-exchanger may suitably consist of a commercially available anion-exchanger compound consisting of a phenol-formaldehyde resin or polystyrene having built-in amino groups.

Thus, according to the invention the ion-exchanger shall be regenerated with a neutral or slightly acid water solution. It is thus possible to dry the regenerated ion-exchanger to a considerably lower water content than a hydroxyl-ion-saturated ion-exchanger. According to the invention the water content should be decreased to less than 10 percent by weight, preferably less than 5 percent by weight. This can be done while still retaining the full effect of the ion-exchanger. The ion-exchanger may be dried at over 100° C. In comparison it may be mentioned that a hydroxyl-ion-saturated anion-exchanger should not be dried at a temperature of more than 60° C., and not to a water content of less than 10%.

The anion-exchanger should suitably replace the chloride ions in the chlorinated hydrocarbon by ions which, after subsequent reactions, product products without corrosive properties, such as bicarbonate ions, or by corrosion-inhibiting ions, such as dihydrogen phosphate, hydrogen phosphate, phosphate, dichromate, chromate. For regenerating the anion-exchanger these ions are added in the form of neutral of slightly acid water solutions, with a suitably selected cation, preferably sodium or potassium. The content of the regenerating ion in the water solution is suitably 0.5–2.0 mol/l., and the temperature of the solution during the regeneration is suitably about 20° C.

During degreasing operations the chloride absorption may for example be arranged so that the pure solvent recirculating from the condensation trap to the boiler in a steam-degreasing apparatus is permitted to flow through a container containing ion-exchanging material. The container should be provided with a liquid lock so that the space between the solid particles of ion-exchanger is completely filled with solvent. It is also feasible to pump the oily liquid from the boiler through a dechlorinating vessel and back to the boiler. This method has the advantage that non-volatile compounds generating chloride ions can also be made harmless. In this way is also achieved a regenerating effect on stabilizers of the amine type existing in the solvent in the form of non-volatile and inactive hydrochloride. For dry cleaning the container with the ion-exchanger should be placed so that pure condensate from distilled washing liquid is led through the ion-exchanger.

EXAMPLE 1

Trichloroethylene containing on average 20 p.p.m. chloride ion (in the form of hydrogen chloride) was permitted to pass through a bed consisting of anion-exchanger compound Amberlite IR-45 at a rate of 30 ml./hour and gram of filter material. The compound was regenerated with neutral potassium bicarbonate solution (pH=7) and was dried to a water content of less than 1%. The solvent leaving the bed was free from chloride until 2.9 mmol chloride had become adsorbed per gram of ion-exchanger material.

EXAMPLE 2

Trichloroethylene containing on average 20 p.p.m. chloride ion (in the form of hydrogen chloride) was permitted to pass through a bed consisting of anion-exchanger compound Amberlite (IR-45) at a rate of 30 ml./hour and gram of filter material. The exchanger compound was regenerated with neutral sodium chromate solution and was dried to a water content of less than 1%. The solvent leaving the bed was free from chloride until 2.0 mmol chloride had become adsorbed per gram of ion-exchanger material.

EXAMPLE 3

Trichloroethylene containing on average 20 p.p.m. chloride ion (in the form of hydrogen chloride) was permitted to pass through a bed consisting of anion-exchanger compound Amberlite IR-45 at the rate of 30 ml./hour and gram of filter material. The exchanger compound was regenerated with neutral sodium phosphate solution and was dried to a water content of less than 1%. The solvent leaving the bed was free from chloride until 2.5 mmol chloride had become adsorbed per gram of ion-exchanger material.

What is claimed is:

1. A method for removing chloride ions from a chlorinated hydrocarbon selected from the group consisting of trichloroethylene and perchloroethylene comprising contacting the chlorinated hydrocarbon with an anion exchanger selected from the group consisting of phenol-formaldehyde resin and polystyrene having amino groups, said exchanger having been regenerated after its initial use by treatment with a neutral or slightly acid aqueous solution containing a regenerating ion selected from the group consisting of the bicarbonate ion, chromate ion, phosphate ion, monohydrogen phosphate ion and dihydrogen phosphate ion, the concentration of said regenerating ion being 0.5 to 2.0 mol per liter of solution, whereby the chloride ions in the chlorinated hydrocarbon are replaced by the regenerating ion, and then drying the exchanger to a water content of less than 10% by weight.

References Cited
UNITED STATES PATENTS 2,888,494    5/1959    Kissling _____ 260—654 S LEON ZITVER, Primary Examiner J. A. BOSKA, Assistant Examiner U.S. Cl. X.R.

260—Dig. 5, 652 P, 2.1 C, 2.1 E

UNITED STATES PATENT OFFICE
CERTIFICATE OF CORRECTION

Patent No. 3,801,659      Dated April 2, 1974

Inventor(s) JAN ANDERS DAHLBERG ET AL

It is certified that error appears in the above-identified patent and that said Letters Patent are hereby corrected as shown below:

In the heading of the patent, insert:

-- Claims Priority, application Sweden,

March 3, 1970, No. 2807/1970 --

Signed and sealed this 17th day of September 1974.

(SEAL)
Attest:

McCOY M. GIBSON JR.
Attesting Officer

C. MARSHALL DANN
Commissioner of Patents